US009061573B2

(12) United States Patent
Zaccaria et al.

(10) Patent No.: US 9,061,573 B2
(45) Date of Patent: Jun. 23, 2015

(54) MOTOR VEHICLE SEAL

(75) Inventors: Manrico Zaccaria, Cirie' (IT); Mauro Chiatti, Cirie' (IT)

(73) Assignee: COOPER-STANDARD AUTOMOTIVE ITALY S.P.A., Cirie' (Torino) (IT)

( * ) Notice: Subject to any disclaimer, the term of this patent is extended or adjusted under 35 U.S.C. 154(b) by 0 days.

(21) Appl. No.: 13/640,880

(22) PCT Filed: Apr. 15, 2011

(86) PCT No.: PCT/IB2011/051646
§ 371 (c)(1),
(2), (4) Date: Oct. 12, 2012

(87) PCT Pub. No.: WO2011/128878
PCT Pub. Date: Oct. 20, 2011

(65) Prior Publication Data
US 2013/0025211 A1    Jan. 31, 2013

(30) Foreign Application Priority Data
Apr. 16, 2010 (IT) .............................. TO2010A0309

(51) Int. Cl.
*B60J 10/00* (2006.01)
*B60J 10/08* (2006.01)
(52) U.S. Cl.
CPC ............ *B60J 10/006* (2013.01); *B60J 10/0031* (2013.01); *B60J 10/081* (2013.01)
(58) Field of Classification Search
CPC ..... B60J 10/006; B60J 10/0031; B60J 10/081

USPC ............................................... 49/498.1, 490.1
See application file for complete search history.

(56) References Cited

U.S. PATENT DOCUMENTS

| 4,310,164 | A | * | 1/1982 | Mesnel .......................... 277/642 |
| 4,813,184 | A | | 3/1989 | Weimar |
| 4,970,102 | A | | 11/1990 | Guillon |
| 4,976,069 | A | * | 12/1990 | Arima et al. ................. 49/490.1 |
| 4,982,529 | A | * | 1/1991 | Mesnel .......................... 49/490.1 |
| 5,367,831 | A | * | 11/1994 | Gunkel .......................... 49/478.1 |
| 5,446,998 | A | * | 9/1995 | Arima .......................... 49/490.1 |
| 5,581,951 | A | | 12/1996 | Ryan et al. |
| 6,457,543 | B1 | | 10/2002 | Wooldridge |
| 7,017,305 | B2 | * | 3/2006 | Ikuta ............................ 49/498.1 |
| 2006/0112645 | A1 | * | 6/2006 | Dron ............................ 49/498.1 |
| 2006/0143988 | A1 | * | 7/2006 | Dillmann ..................... 49/498.1 |

FOREIGN PATENT DOCUMENTS

| DE | 20312327 U1 | 10/2003 |
| EP | 0115750 A1 | 8/1984 |
| EP | 0343046 A1 | 11/1989 |
| EP | 0407364 A1 | 1/1991 |
| EP | 0428349 A2 | 5/1991 |
| EP | 1647664 A2 | 4/2006 |

(Continued)

*Primary Examiner* — Gregory Strimbu
(74) *Attorney, Agent, or Firm* — Sughrue Mion, PLLC

(57) ABSTRACT

A motor vehicle seal which includes a fixing profile (5) to which a tubular sealing profile (6) is connected. At least one predetermined portion of the wall of the sealing profile has at least one outer groove (12, 14) defining an integral film hinge (13, 15) which reduces the resistance of the sealing profile (6) to compression in the direction of engagement (F) between the opening (2) and the door (D).

8 Claims, 5 Drawing Sheets

(56) References Cited

FOREIGN PATENT DOCUMENTS

| FR | 2381890 | A1 | 9/1978 |
| FR | 2517011 | A3 | 5/1983 |
| FR | 2607216 | A1 | 5/1988 |
| FR | 2862574 | A1 | 5/2005 |
| GB | 2110281 | A | 6/1983 |

* cited by examiner

MOTOR VEHICLE SEAL

CROSS REFERENCE TO RELATED APPLICATIONS

This application is a National Stage of International Application No. PCT/IB2011/051646 filed Apr. 15, 2011, claiming priority based on Italian Patent Application No. TO2010A000309 filed Apr. 16, 2010, the contents of all of which are incorporated herein by reference in their entirety.

BACKGROUND OF THE INVENTION

The present invention relates in general to motor vehicle seals.

More specifically the invention relates to a seal for positioning between the edge of an opening in the body of a vehicle and an associated door movable between an open position and a closed position.

Application FR 2,607,216 describes a seal of this type in which the wall of the tubular sealing profile is provided with inner longitudinal grooves having the function of allowing this sealing profile to be easily collapsed in such a way that it nevertheless has an aesthetically acceptable appearance, by means of suction of the air contained inside it, via a pump, when the door is open. Said sealing profile is then inflated again after the door has been closed.

U.S. Pat. No. 6,457,543 B1 describes a seal with a sealing profile which is likewise provided with inner longitudinal grooves.

The application EP 0,115,750 A1 describes an extruded elastomer seal, the tubular sealing profile of which has a greater wall thickness in the seal portions intended to be engaged with corner portions of the edge of the corresponding motor vehicle opening, in order to solve the sealing problems and correct the aesthetic appearance of the sealing profile in these corner portions.

The application FR-2,862,574-A describes a similar motor vehicle seal in which, in order to reduce the transmission, to the passenger compartment, of low-frequency noise generated by the chassis, the wall thickness of the sealing profile is locally increased only at the ends of the top section of the opening in the vehicle body and is also reduced in the intermediate portion between said ends.

The application EP 0,407,364 A1 discloses an extruded seal in which the tubular sealing profile has a wall thickness which is essentially constant along the entire length of the seal, although it has a larger cross-section in critical portions of the edge of the corresponding opening of the motor vehicle body.

One object of the present invention is to propose an innovative solution which allows variation in the resistance of the sealing profile to compression thereof, so as to allow better distribution of this resistance along the edge of the motor vehicle opening.

SUMMARY OF THE INVENTION

This object, together with others, is achieved according to the invention by means of a seal as described and claimed herein.

BRIEF DESCRIPTION OF THE DRAWINGS

Further characteristic features and advantages of the invention will become clear from the following detailed description provided purely by way of a non-limiting example, with reference to the accompanying drawings in which.

DETAILED DESCRIPTION OF THE DRAWINGS

Figure 1:
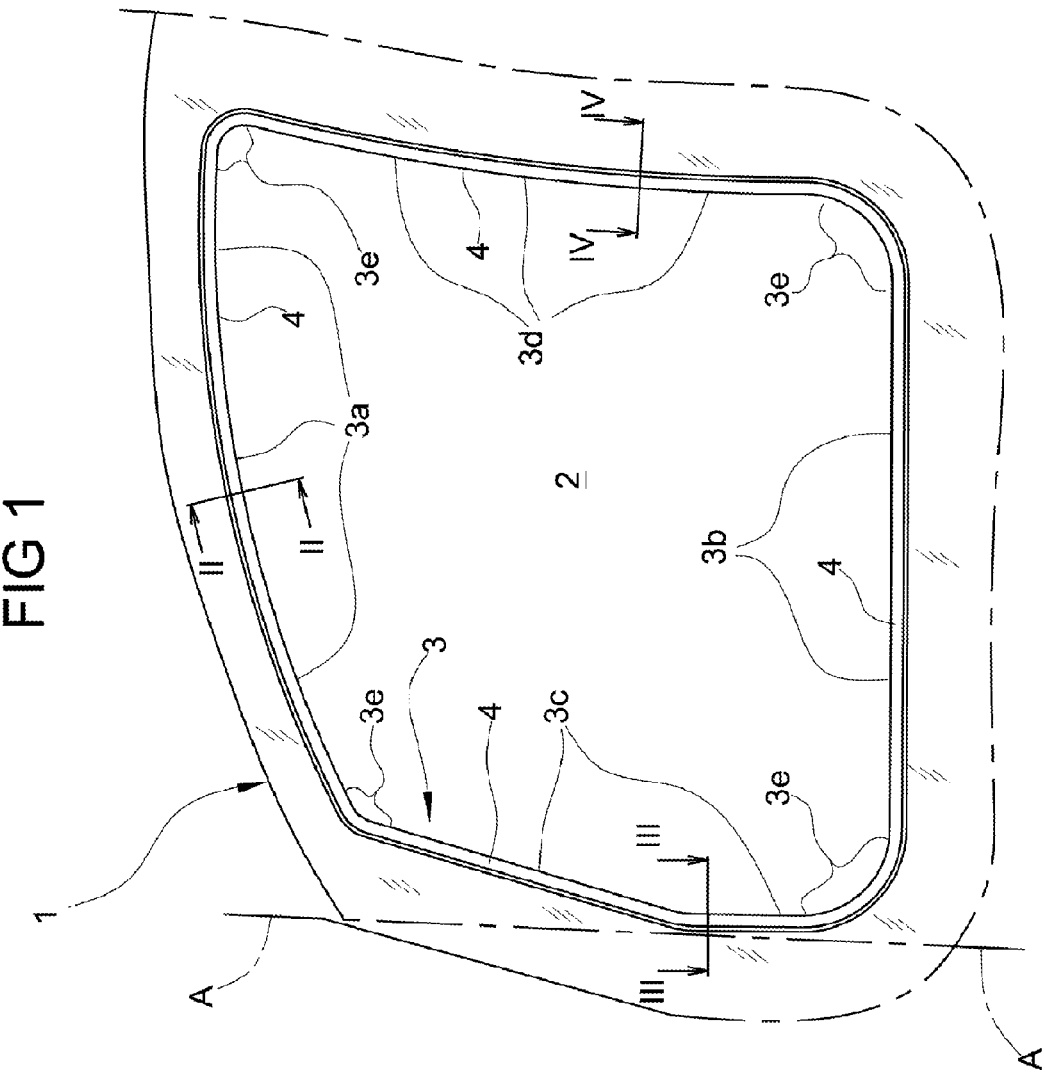
FIG. 1 is a partial side view of the body of a motor vehicle having an opening for a side door, this opening being provided with a seal according to the present invention.

With reference to FIG. 1, 1 denotes in its entirety the body of a vehicle, for example a motor car, having an opening 2. In the example of embodiment shown the opening 2 is an opening for a front side door (not shown) of the motor vehicle.

In the description below it will be assumed that the door associated with the opening 2 can be pivoted in a manner known per se between an open position and a closed position about an at least approximately vertical axis indicated by A-A in FIG. 1. In the present description and in the claims below, the expression "at least approximately vertical axis" is understood as meaning an axis forming an angle of between about −10° and about +10° with respect to the vertical.

The opening 2 has an edge 3 which comprises a top section 3a and a bottom section 3b which are interconnected by a first side section 3c and by a second side section 3d, respectively close to and far from the axis A-A.

A seal denoted overall by 4 is fixed to the edge 3 of the opening 2.

Figure 2:
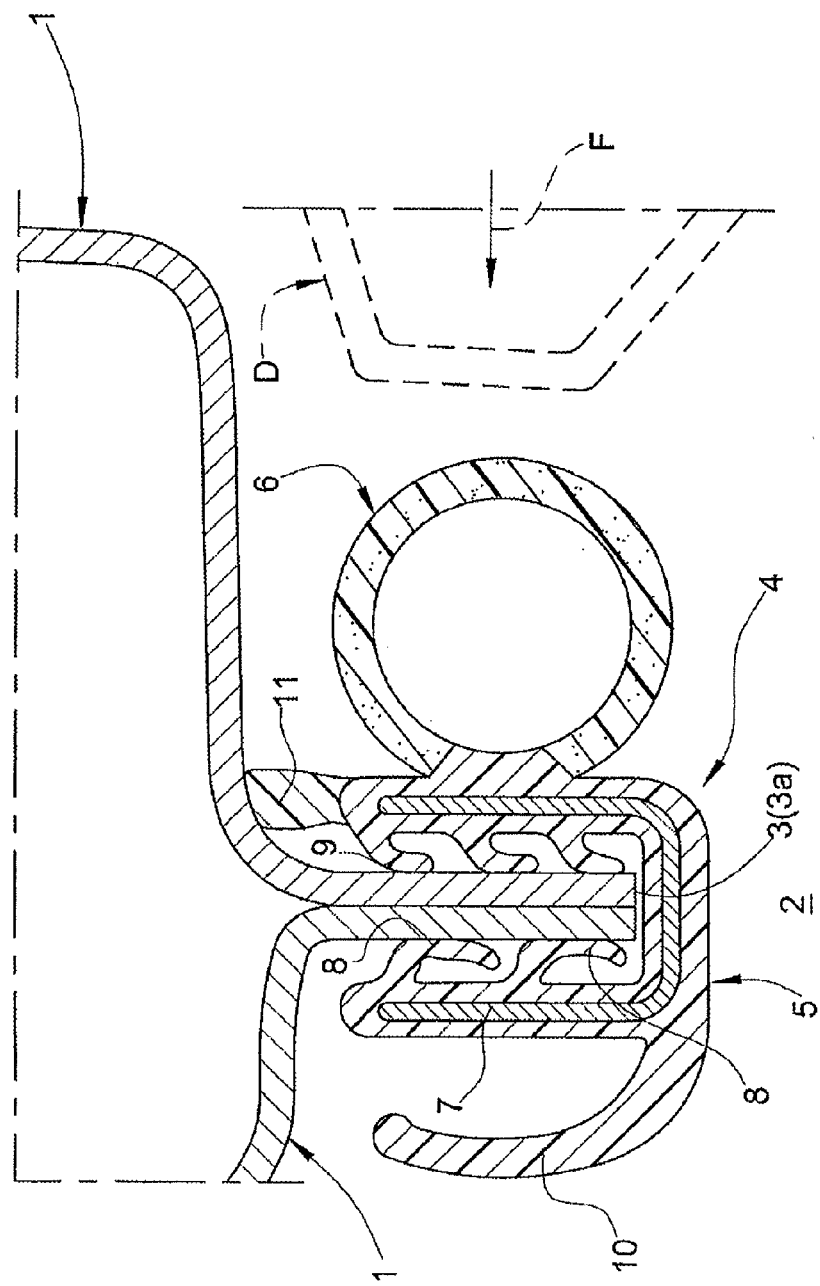
FIGS. 2 to 4 are partial views cross-sectioned essentially along the lines II-II, III-III and IV-IV, respectively, of FIG. 1.

With reference for example to FIG. 2, the seal 4 comprises a fixing profile 5 which has an essentially U-shaped or channel-like form and is made of an elastomer material and to which a tubular sealing profile 6, for example made of cellular elastomer material, is connected, being coextruded with the fixing profile 5.

In the embodiment shown by way of example, the fixing profile 5 comprises a reinforcement 7, for example made of metal, which is incorporated inside it during extrusion.

The fixing profile 5 has internally two opposite rows of flexible retaining lugs 8 and 9 which engage with opposite sides of the flanged edge 3 of the opening 2 in the motor vehicle body.

In the example of embodiment shown, the fixing profile 5 also has a lateral flange 10, which is operatively directed towards the inside of the motor vehicle, and a sealing lug 11 (see in particular for example FIG. 2).

Figure 3:
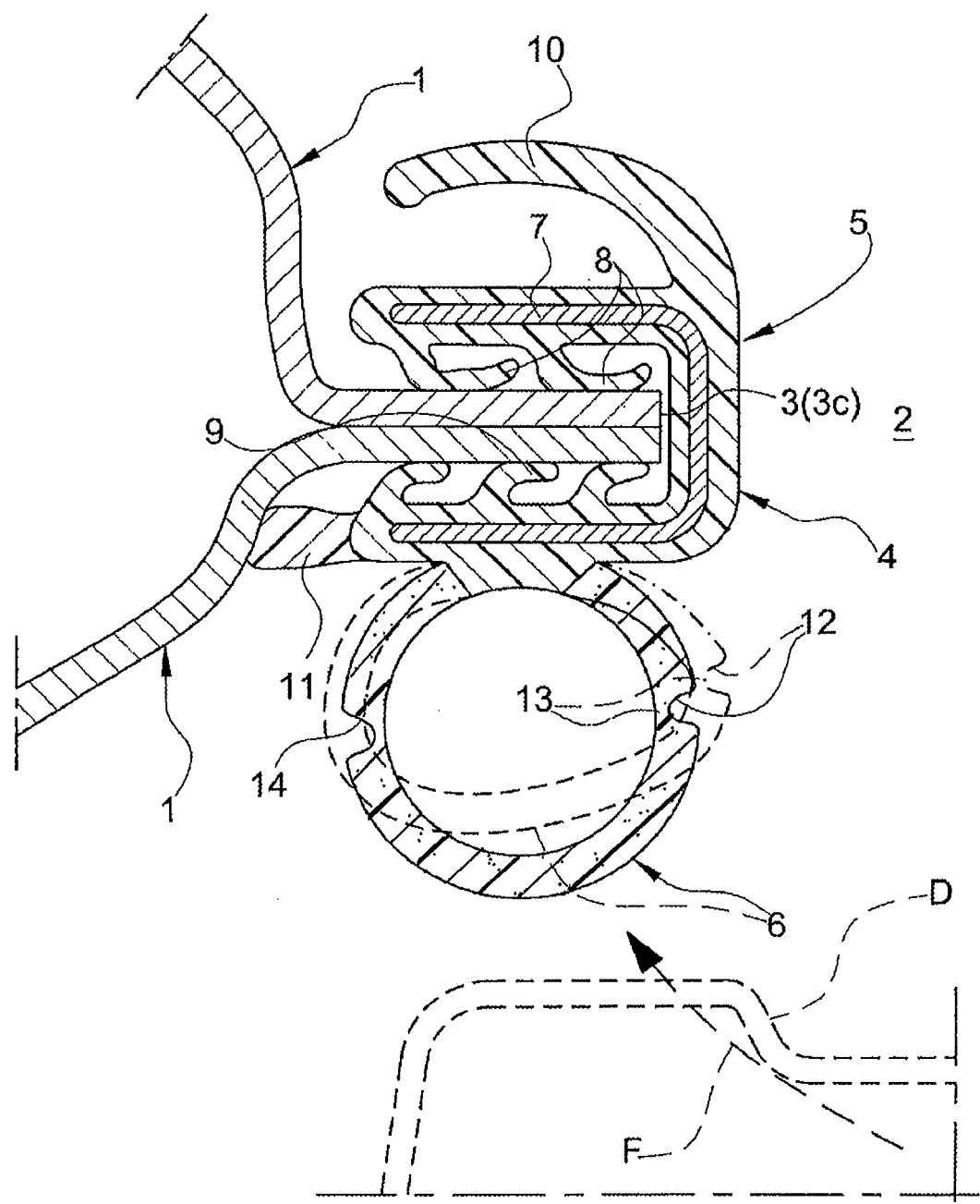

The tubular sealing profile 6 in the configuration shown by way of example has an essentially annular cross-section which is at least approximately circular. With reference to FIGS. 2 and 3, the distal portion of the sealing profile 6 is intended during use to be engaged by a door D of the motor vehicle, which in these figures is partially shown in broken lines.

In the embodiment shown by way of example, in the portion of the seal 4 operatively applied to the top section 3a of the edge 3 of the opening 2 of the vehicle the sealing profile 6 has a substantially uniform thickness, as can be seen in FIG. 2.

In the embodiment shown the motor vehicle door is hinged with the body 1 of the vehicle via hinging means (of the type known per se and not shown) along the side section 3c of the edge 3 of the motor vehicle opening 2. Along the portion of the seal 4 which is applied to this section 3c the seal 6 conveniently has an outer groove 12 which is substantially longitudinal (see in particular FIG. 3). The presence of the groove 12 and the corresponding local reduction in the wall thickness of the sealing profile 6 define a kind of film hinge 13 which is substantially horizontal and able to reduce the resistance of the profile 6 to compression in the direction of engagement between the door D and the edge 3 of the opening 2 of the vehicle (see again FIG. 3, where said engaging direction is indicated by the arrow F).

Owing to the presence of the outer groove 12, along the section 3c of the edge of the motor vehicle opening the sealing profile 6 of the seal 4 is more yielding when it is "pinched" between the door and the edge of the vehicle opening.

A greater compressive yielding action of the sealing profile 6 along the portion of the seal 4 applied to the section 3c of the motor vehicle opening may be obtained if necessary by forming in the profile 6 a second outer groove, such as that indicated by 14 in FIG. 3, and optionally an additional or third groove (not shown).

Figure 4:
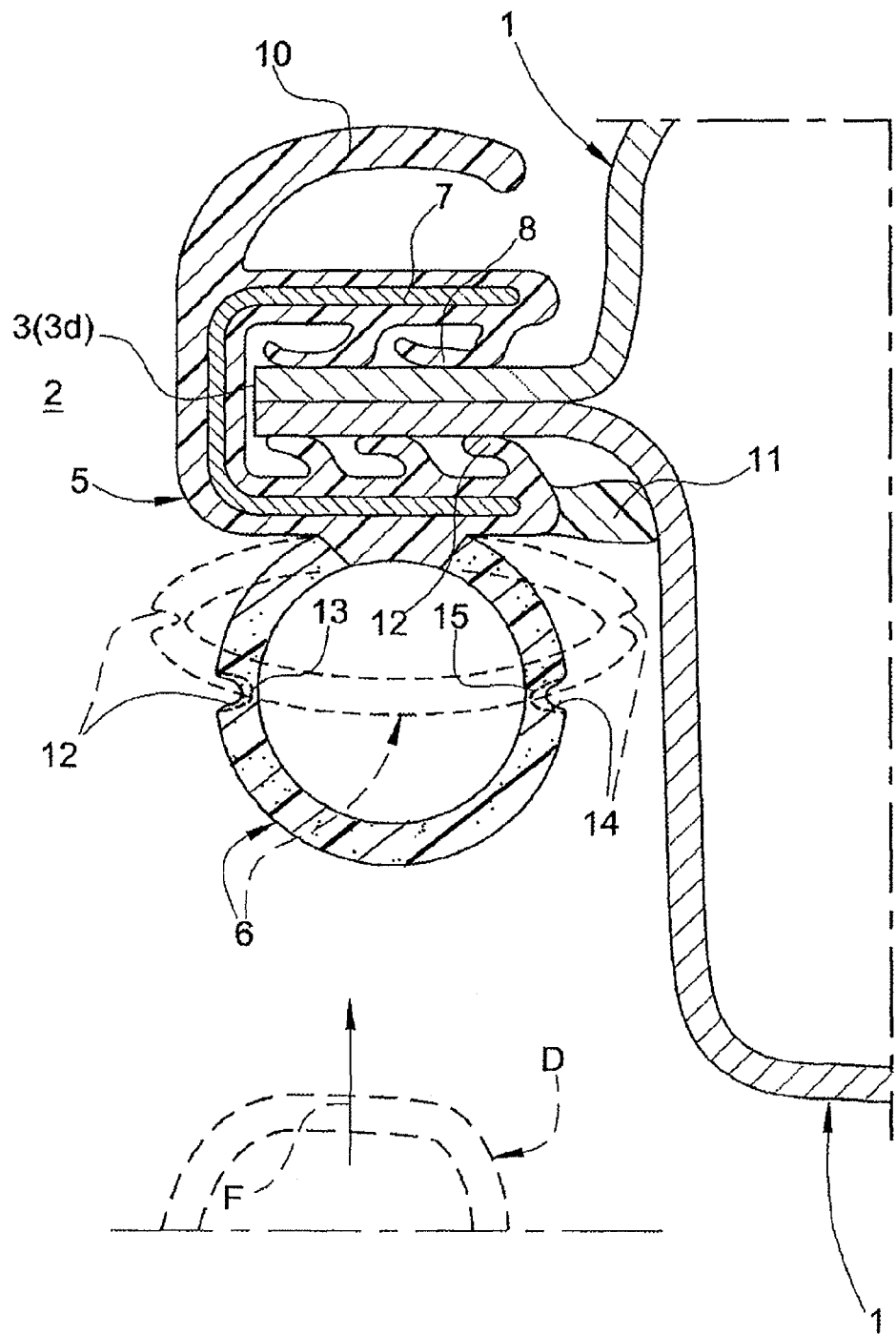

Conveniently, as shown in FIG. 4, along the portion of the seal 4 intended to be applied to the section 3d of the edge of the motor vehicle opening, the tubular sealing profile 6 is provided with (at least) two outer grooves 12 and 14, preferably facing each other in a direction at least approximately at right angles to the direction of engagement F between the door and the corresponding opening in the motor vehicle. An optimum yielding effect of the sealing profile 6 is thus obtained along this portion of the seal 4, owing to the "hinges" 13 and 15 which are defined by means of the corresponding reductions in the wall thickness.

It is likewise advantageous if the sealing profile 6, along the portion of the seal 4 applied to the bottom section 3b of the edge of the opening 2 of the motor vehicle, has a cross-section corresponding to that shown in FIG. 4 and therefore with (at least) two oppositely facing outer grooves.

In FIG. 1 3e denotes the corner portions of the edge 3 of the opening 2 in the motor vehicle body.

Conveniently, along the portions of the seal 4 intended to engage with the corner portions 3e of the edge 3 of the motor vehicle opening, the sealing profile 6 does not have outer grooves and therefore has the form shown in FIG. 2. This avoids both problems of an aesthetic nature (wrinkles) and those related to the sealing action (a more rigid profile is more suitable for ensuring water tightness) along said corner portions.

Advantageously, the outer groove or grooves of the sealing profile 6 has/have substantially a channel-like form, the side walls of which are connected to the bottom by means of curved profiles, in order to prevent a concentration of stress in the connecting zone and the consequent risks of tearing of the wall of said sealing profile.

Figure 5:
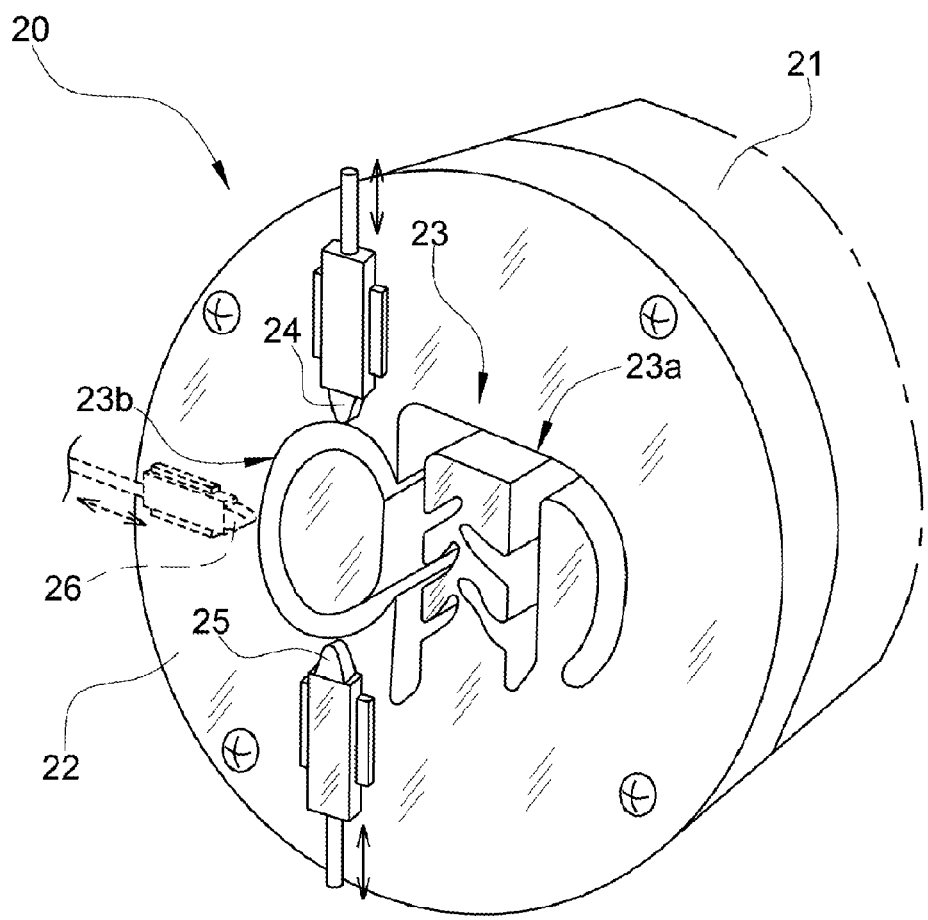
FIG. 5 is a partial perspective view which shows an extrusion device which can be used for manufacturing a seal according to the present invention.

FIG. 5 shows the features of an extruder device 20 which can be used to manufacture a seal according to the present invention.

The extruder device 20 comprises a body 21 to which, in a manner known per se and not shown, a flow of "hard" elastomer material is supplied in order to form the fixing profile 5, a metal reinforcement 7 intended to be incorporated in said fixing profile, and a flow of cellular elastomer material or so-called "foam rubber" for forming the tubular sealing profile.

The body 21 of the extruder terminates in a die 22 which defines an extrusion orifice 23, including a portion 23a intended to shape the fixing section 5, and an adjacent orifice portion 23b, intended to shape the tubular sealing profile 6.

Two shutter devices 24 and 25 are mounted in a slidable movable manner on essentially opposite sides of the axis of the portion 23b of the extrusion orifice, being movable (via actuator means and control means which are known per se and not shown) between an inactive position, where they do not interfere with the flow of extruded material emerging from the orifice portion 23b, and an active position, where they interfere with this flow, each forming a respective longitudinal outer groove in the sealing profile 6, as the latter is extruded.

Activation of the shutter devices 24 and 25 may be synchronized in a manner known per se with the advancing movement of the die emerging entirely outside the extrusion orifice 23 of the die 22, so as to form the outer groove or grooves of the sealing profile 6 precisely in the desired portions of the seal obtained.

FIG. 5 shows in broken lines an optional additional movable shutter device 26 arranged between the shutter devices 24 and 25, so as to form an optional third groove in the sealing profile.

Conveniently, the outer groove or grooves 12, 14 of the sealing profile 6 may be formed so that its/their cross-section has a form, and in particular a depth, which varies, in a continuous or non-continuous manner, in the longitudinal direction of the groove (as shown in phantom in figure), in order to "distribute" better the resistance to compression in the longitudinal direction of the seal. The variation in the cross-section of the groove or grooves may be easily achieved during extrusion by means of the apparatus shown in FIG. 5, by means of suitable control of the movement of its movable shutter devices.

Obviously, without affecting the principle of the invention, the embodiments and the constructional details may be substantially varied with respect to that described and illustrated purely by way of a non-limiting example, without thereby departing from the scope of the invention as defined in the accompanying claims. Thus, for example, the tubular sealing profile may have a cross-section different from a circular cross-section and may be divided into two portions by an internal transverse partition.

The invention claimed is:

1. A seal (4) for positioning between an edge (3) of an opening (2) in a body (1) of a vehicle and an associated door (D) movable between an open position and a closed position, said door (D) being hinged on the body (1) of the vehicle along a first predefined section (3c) of the edge (3) of said opening (2); the seal (4) comprising a fixing profile (5) and a tubular sealing profile (6) connected thereto; a wall of the sealing profile having a substantially longitudinal outer groove (12, 14) extending parallel to a longitudinal axis of the seal and defining an integral film hinge (13, 15) extending parallel to the longitudinal axis of the seal; wherein the outer groove (12, 14) is provided only along a portion of the longitudinal axis of the seal, said portion of the longitudinal axis being configured to be associated with said first predefined section (3c) of the edge (3) of said opening (2), said outer groove (12, 14) reducing a resistance of said sealing profile (6) to compression in a direction generally perpendicular to the longitudinal axis of the seal, wherein the tubular sealing profile has a generally consistent wall thickness, and wherein the outer groove is defined by a reduction in the wall thickness of the sealing profile (6) and is formed during extrusion of the seal (4).

2. The seal according to claim 1, wherein said portion of the longitudinal axis of the seal has a second substantially longitudinal outer groove which is parallel and opposite to said groove.

3. The seal according to claim 2, wherein the wall of the sealing profile has a pair of outer grooves provided along a second portion of the longitudinal axis of the seal, said second portion of the longitudinal axis of the seal is configured to be associated with a second section (3*d*) of the edge of said opening (2), said second section being opposite to said first section 7(3*c*).

4. The seal according to claim 1, wherein said door (D) is pivotable about an axis (A-A) which is approximately vertical and the edge (3) of the opening (2) comprises a top section (3*a*) and a bottom section (3*b*) which are interconnected by a first side section comprising said first predefined section and a second side section (3*c*, 3*d*), wherein said first side section is closer to said axis (A-A) of the door than said second side section, and wherein the wall of the sealing profile has a second substantially longitudinal outer groove provided along a second portion of the longitudinal axis of the seal, said section portion of the longitudinal axis of the seal is (4) intended to be associated with the bottom section (3*b*) of the edge (3) of said opening (2).

5. The seal according to claim 1, wherein the wall of the tubular sealing profile (6) is devoid of said outer groove (12, 14) along portions of the seal to be applied to corner portions (3*e*) of the edge (3) of said opening (2).

6. The seal according to claim 1, wherein said outer groove (12, 14) is u-shaped, and has a bottom and side walls the side walls are connected to the bottom of said outer groove by curved profiles.

7. The seal according to claim 1, wherein said outer groove (12, 14) has a cross-section having a depth, said depth varies in a predetermined manner along the longitudinal axis of the steal.

8. The seal according to claim 1, wherein the sealing profile (6) has an additional outer groove.

* * * * *